United States Patent
Lachowicz et al.

(10) Patent No.: US 6,897,264 B2
(45) Date of Patent: May 24, 2005

(54) CURABLE MIXTURES

(75) Inventors: Artur Lachowicz, Berlin (DE); Kai-Uwe Gaudl, Hohen Neuendorf (DE); Gerwald Grahe, Berlin (DE)

(73) Assignee: Dainippon Ink and Chemicals, Inc., Tokyo (JP)

( * ) Notice: Subject to any disclaimer, the term of this patent is extended or adjusted under 35 U.S.C. 154(b) by 0 days.

(21) Appl. No.: 10/321,797

(22) Filed: Dec. 18, 2002

(65) Prior Publication Data

US 2003/0162904 A1 Aug. 28, 2003

(30) Foreign Application Priority Data

Dec. 21, 2001 (DE) .......................................... 101 63 431

(51) Int. Cl.$^7$ ............................................... C08L 77/06
(52) U.S. Cl. ....................... 525/436; 525/421; 525/425; 526/208; 526/193
(58) Field of Search ................. 525/436, 421, 525/425; 526/193, 208; 522/178, 179

(56) References Cited

U.S. PATENT DOCUMENTS

| 2,675,372 A | | 4/1954 | Coover, Jr. et al. ........ 260/88.7 |
| 5,169,979 A | * | 12/1992 | Kubillus et al. ............ 560/176 |
| 5,466,863 A | * | 11/1995 | Heidt et al. ................. 560/176 |
| 6,249,638 B1 | * | 6/2001 | Hale .......................... 385/145 |
| 6,277,986 B1 | * | 8/2001 | Hall-Goulle et al. ........ 544/279 |
| 6,576,684 B1 | * | 6/2003 | Desobry et al. ............ 522/167 |
| 2001/0047071 A1 | * | 11/2001 | Van Dijk et al. ............. 528/51 |

FOREIGN PATENT DOCUMENTS

WO        01/00684 A1        1/2001

OTHER PUBLICATIONS

R.J. Clemens et al., "A Comparison of Catalysts for Crosslinking Acetoacetylated Resins via the Michael Reaction", *JCT. Journal of Coatings Technology*, vol. 61, No. 770, Mar. 1, 1989, pp. 83–91.

European Search Report dated Feb. 17, 2004.

* cited by examiner

*Primary Examiner*—Tatyana Zalukaeva
(74) *Attorney, Agent, or Firm*—Armstrong, Kratz, Quintos, Hanson & Brooks, LLP

(57) ABSTRACT

A catalyst suitable for crosslinking reaction of a compound containing α,β-unsaturated carbonyl groups and a compound containing a CH-acidic methylene group is provided. A curable mixture comprises at least one compound containing at least two α,β-unsaturated carbonyl groups and at least one compound containing at least one CH-acidic methylene group and at least one trialkylphosphine.

5 Claims, No Drawings

CURABLE MIXTURES

BACKGROUND OF THE INVENTION

1. Field of the Invention

The invention relates to curable mixtures, containing compounds with α,β-unsaturated carbonyl groups and compounds containing CH-acidic methylene groups and trialkylphosphine catalysts.

2. Description of Related Art

Curable mixtures containing compounds with α,β-unsaturated carbonyl groups such as acrylates methacrylates, fumarates, maleates or itaconates and activated carbonyl compounds, containing C—H acidic methylene groups as for example acetoacetates, malonates, β-diketones and β-cyanoacetates are useful as coating materials for paper, wood, metal, plastics, as binders in printing inks, adhesives and for the encapsulation of semiconductor materials. The curing of these mixtures, hereinafter also termed as crosslinking or hardening, is achieved by reaction of the activated double bonds of the α,β-unsaturated carbonyl groups with the C—H acidic methylene groups of the activated carbonyl compounds in presence of a strong basic catalyst.

Examples of such reactions are described in the German patent specification 835809. Curable mixtures containing acrylates and acetoacetates are described in the U.S. Pat. No. 4,408,018. Curable mixtures of malonates and acrylates are disclosed in the U.S. Pat. No. 4,602,061. Such curable mixtures are particularly suitable for hardening of coating materials, as the crosslinking reaction the so called "Michael addition" (Organikum, VEB Deutscher Verlag der Wissenschaften, 16th edition, Berlin 1986, page 509–510) is fast also at low temperatures and no volatile organic splitting products are formed, which may contaminate the environment. However, the reaction requires a strong basic catalyst (pk>12), preferred catalysts are for example amidines such as 1,8-diazabicyclo(5.4.0)undec-7-ene, 1,5-diazabicyclo(4.3.0)non-5-ene or tetramethylguanidine. The disadvantage of this process is that the strong basic catalyst remains in the cured coating, paint or ink and may cause problems. It is a matter of common knowledge, that for example strong amines may cause yellowing. Another drawback of coatings, derived form acetoacetates, acrylates and strong amines such as amidines, is their hydrolysis sensitivity. This is also described in literature (Journal of Coatings Technology, Vol. 61, No. 770, March 1989, page 89). The authors attribute this to the high basisity of the amines, which remain in the cured product and promote ester hydrolysis in the presence of humidity. Amines having lower pk of about 10 are not suitable for the Michael addition of compounds containing α,β-unsaturated carbonyl groups and compounds containing CH-acidic methylene groups. Inorganic bases such as potassium hydroxide or tetramethylammonium hydroxide, which may be used as well, should even increase the hydrolysis sensitivity.

BRIEF SUMMARY OF THE INVENTION

In course of the search for suitable catalysts we found unexpectedly that trialkylphosphines are particularly suitable as catalysts for the crosslinking reaction of compounds containing α,β-unsaturated carbonyl groups and compounds containing CH-acidic methylene groups. Due to the very low pk of the tertiary alkyl phosphines (pk~3–6), these catalysts are not able to promote ester hydrolysis in the cured coating or ink. A discoloration or yellowing was not observed as the decomposition products of the phosphines, the phosphine oxides, are colorless and inert compounds, whereas the oxidation products of amine catalysts are often colored and therefore responsible for yellowing in the coating.

Accordingly, this invention provides a curable mixture comprising at least one compound containing at least two α,β-unsaturated carbonyl groups and at least one compound containing at least one CH-acidic methylene group and at least one trialkylphosphine.

DETAILED DESCRIPTION OF THE INVENTION

The qualification of the tertiary alkyl phosphines as catalysts in the above mentioned crosslinking reaction was unsuspected since it is a matter of common knowledge that the alkyl phosphines are unstable compounds in presence of air. The fast oxidation by air and pyrophoric properties of lower tertiary alkylphosphines such as triethylphosphine, tripropylphosphine or tributylphosphine, gave rise for the assumption that alkylphosphines as such are rather unsuitable for the intended application as crosslinking catalysts for the "Michael addition". Therefore, it may not be anticipated that especially higher tertiary alkyl phosphines are suitable catalysts for the crosslinking reaction of compounds containing α,β-unsaturated carbonyl groups and compounds containing CH-acidic groups. However, we found that for example tricyclohexylphosphine already exhibits sufficient stability in curable mixtures of this invention, but maintains simultaneously high catalytic activity to promote the Michael addition.

Examples of suitable trialkylphosphine catalysts in the curable mixtures of this invention are tricyclopentylphosphine, tris(2,4,4-trimethylpentyl) phosphine, tricyclohexylphosphine, tri-n-hexylphosphine, tris(2-ethylhexyl)phosphine, tri-n-octylphosphine, tri-n-decylphosphine, tri-n-dodecylphosphine, tristearylphosphine, particulary suitable are tricyclohexylphosphine, tri-n-octylphosphine and tri-n-dodecylphosphine. The phosphines are state of the art and commercially available or may be prepared after the known methods of organic systheses as for example by addition of alkenes to phosphan or by "Grignard" reactions of alkylmagnesium-halogenides with phosphorus trichloride.

Compounds containing α,β-unsaturated carbonyl groups, which are suitable for the preparation of the curable mixtures of this invention, are for example 1,2-ethanediol diacrylate, 1,3-propanediol diacrylate, 1,4-butanediol diacrylate, 1,6-hexanediol diacrylate, dipropylene glycol diacrylate, neopentyl glycol diacrylate, ethoxylated neopentyl glycol diacrylate, propoxylated neopentyl glycol diacrylate, tripropylene glycol diacrylate, bisphenol A diglycidyl ether diacrylate, ethoxylated bisphenol A diglycidyl ether diacrylate, polyethylene glycol diacrylate, trimethylolpropane triacrylate, ethoxylated trimethylolpropane triacrylate, propoxylated trimethylolpropane triacrylate, propoxylated glycerol triacrylate, tris(2-acryloyloxyethyl) isocyanurate, pentaerythritol triacrylate, ethoxylated pentaerythritol triacrylate, pentaerythritol tetraacrylate, ethoxylated pentaerythritol tetraacrylate, ditrimethylolpropane tetraacrylate, dipentaerythritol pentaacrylate, dipentaerythritol hexaacrylate, 1,2-ethanediol dimethacrylate, 1,3-propanediol dimethacrylate, 1,4-butanediol dimethacrylate, 1,6-hexanediol dimethacrylate, dipropylene glycol dimethacrylate, neopentyl glycol dimethacrylate, ethoxylated neopentyl glycol dimethacrylate, propoxylated neopentyl glycol dimethacrylate, tripropylene glycol dimethacrylate, bisphenol A diglycidyl ether dimethacrylate, ethoxylated bisphenol A diglycidyl ether dimethacrylate, polyethylene glycol dimethacrylate, trimethylolpropane trimethacrylate, ethoxylated trimethylolpropane trimethacrylate, propoxylated trimethylolpropane trimethacrylate, propoxylated glycerol trimethacrylate, tris(2-methacryloyloxyethyl)isocyanurate, pentaerythritol trimethacrylate, ethoxylated pentaerythritol trimethacrylate, pentaerythritol tetramethacrylate, ethoxylated pentaerythritol tetramethacrylate, ditrimethylolpropane tetramethacrylate, dipentaerythritol pentamethacrylate, dipentaerythritol hexamethacrylate as well as acrylate group-containing oligomers and polymers obtained by reacting polyepoxides with acrylic acid (epoxyacrylates) or obtained by reacting polyester polyols with acrylic acid and/or monomeric alkyl acrylates (polyester acrylates). Furthermore, suitable are also oligomeric or polymeric fumarates maleates, itaconates, cinnamates as well as derivatives of crotonic acid and vinyl ketones.

Suitable compounds containing CH-acidic methylene groups are pentane-2,4-dione, hexane-2,4-dione, heptane-2,4-dione, 1-methoxy-2,4-pentanedione, 1-phenyl-1,3-butanedione, 1,3-diphenyl-1,3-propanedione, 4,6-dioxoheptanoic acid methyl ester, 5,7-dioxooctanoic acid methyl ester, benzoylacetic acid methyl ester, benzoylacetic acid ethyl ester, benzoylacetic acid butyl ester, propionylacetic acid ethyl ester, propionylacetic acid butyl ester, butyrylacetic acid methyl ester, acetoacetic acid methyl ester, acetoacetic acid ethyl ester, acetoacetic acid isopropyl ester, acetoacetic acid butyl ester, acetoacetic acid tert-butyl ester, acetoacetic acid-(2-methoxyethyl)ester, acetoacetic acid-(2-ethylhexyl)ester, acetoacetic acid lauryl ester, 2-acetoacetoxyethyl acrylate, 2-acetoacetoxyethyl methacrylate, acetoacetic acid benzyl ester, 1,4-butanediol diacetoacetate, 1,6-hexanediol diacetoacetate, neopentyl glycol diacetoacetate, 2-ethyl-2-butyl-1,3-propanediol diacetoacetate, cyclohexanedimethanol diacetoacetate, ethoxylated bisphenol A diacetoacetate, trimethylolpropane triacetoacetate, glycerol triacetoacetate, pentaerythritol triacetoacetate, pentaerythritol tetraacetoacetate, ditrimethylolpropane tetraacetoacetate, dipentaerythritol hexaacetoacetate as well as acetoacetate group-containing oligomers and polymers obtained by transesterification of acetoacetic acid ethyl ester with oligomeric or polymeric polyols, and acetoacetate group-containing oligomers and polymers obtained by copolymerisation of 2-acetoacetoxyethyl methacrylate, malonic acid dimethylester, malonic acid diethylester, malonic acid dipropylester, malonic acid diisopropylester, malonic acid dibutylester, malonic acid di(2-ethylhexylester), malonic acid dilaurylester, oligomers and polymers obtained by of dialkyl malonates and diols.

The curable mixtures of this invention may be prepared by various known methods. For example they may be prepared by mixing the raw materials uniformly or dissolving the raw materials in each other. More practical, the phosphine catalyst is dissolved in the compound, containing CH-acidic methylene groups and this mixture is then added mixed or dissolved prior to application with the compound containing the α,β-unsaturated carbonyl groups. In this way local high concentrations of catalyst are avoided. This method is also recommended in case that the phosphine is a solid such as tricyclohexyl phosphine. This method also increases the pot live of the curable mixtures of this invention and the processing time during application. The ratio of α,β-unsaturated carbonyl groups and the CH-acidic groups may be varied over a wide range and depends on the desired crosslinking density in the cured product. The crosslinking density may influence the properties of the cured product, such as flexibility, solvent resistance and hardness. Suitable are for example ratios of α,β-unsaturated carbonyl groups to CH-acidic methylene groups from 1:3 to 3:1. The CH-acidic methylene groups are regarded as difunctional as they own two active hydrogen atoms, which may react with two α,β-unsaturated carbonyl groups.

The amount of trialkylphosphine catalyst is 0.05–5.0 weight % of the total mixture, preferred 0.5–2.0%. The amount of used trialkylphosphine catalyst depends on its own special catalytic activity in a given curable mixture and must be adjusted by a person skilled in the art to provide a decent curing rate as well a sufficient pot life. The hardening of the curable mixtures of this invention may occur at room temperature or at elevated temperature. The curable mixtures may be applied on various substrates such as metal, wood, plastics and paper.

The curable mixtures of this invention may also contain the known additives such as fillers, flow agents, wetting agents, slip agents, degassers and deaerator, softeners and solvents.

Preferred solvents are such containing CH-acidic groups or α,β-unsaturated carbonyl groups and which are able to participate in the Michael reaction. Examples for such reactive diluents are trimethylolpropane triacrylate, dimethylmalonate or ethylacetoacetate.

In order to support the anticipated positive technical effect of improved hydrolysis, a cured product derived from a curable mixture of this invention was compared to cured a product derived from a curable mixture containing the strong basic catalyst 1,8-diazabicyclo(5.4.0)undec-7-ene (DBU).

The testing of the hydrolysis stability was performed as described by the following procedure. One of two identical test mixture of trimethylolpropane triacrylate (TMPTA) and a diacetoacetate was mixed with TOP(tri-n-octyl phosphine) and the other one with DBU (1,8-diazabicyclo(5.4.0)undec-7-ene) as a comparative mixture. The mixtures were cast on glass plates in a thickness of 10 micron and cured at 120° C. for 15 minutes (see also table 1).

TABLE 1

| | Mixture 1 | Comparative mixture |
| --- | --- | --- |
| Composition: | 6.00 g TMPTA | 6.00 g TMPTA |
| | 6.00 g diacetoacetate[1] | 6.00 g diacetoacetate[1] |
| | 0.25 g TOP | 0.25 g DBU |
| Viscosity: | 200 mPas | 205 mPas |
| Coating thickness: | 10 μm | 10 μm |

[1](molecular weight 440) obtained by transesterification of 2-butyl-2-ethyl propandiol and ethyl acetoacetate.

After the crosslinking, the specimen were immersed for 2 hours in boiling water. Then, the coatings were peeled off from the substrate, dried and placed on an ATR crystal in an infrared spectrometer. The coatings prepared with DBU, showed an decrease of 10% in transmission at a wave number of 3400–3600 cm$^{-1}$, which may be interpreted by an increase of carboxyl groups and hydroxyl groups due to hydrolysis. Furthermore, the coating derived from the comparative curable mixture containing DBU showed light blistering and haziness, whereas the cured coating, derived from the curable mixture containing the phosphine catalyst, remained also visibly intact. This result supports the findings of the authors in "Journal of Coatings Technology, Vol. 61, No. 770, March 1989, page 89, that polyester coatings, containing strong basic catalysts are sensitive to hydrolysis. This justifies the urge for alternative catalysts, which are no strong bases, which was accomplished by this invention with the trialkylphosphines.

The curable mixtures of this invention are useful to give crosslinked colorless and hydrolysis resistant products, which may be used for example in thermosetting coatings, paints and inks.

Objects and advantages of this invention are further illustrated by the following examples, but the particular materials and amounts thereof recited in these examples, as well as other conditions and details should not be construed to limit this invention.

EXAMPLES

Example 1

8.6 g of an oligomeric malonate (molecular weight=1170, viscosity=2200 mPas at 25° C.), obtained by transesterification of dimethylmalonate and ethylene glycol, was mixed with 220 mg of tri-n-octyl phosphine. Then, 6.0 g of trimethylopropane triacrylate was added under agitation. After 60 seconds of intensive agitation the mixture was applied on an aluminum specimen. The pot live (doubling of the viscosity) of the mixture was 3 minutes.

| Viscosity of the curable mixture | Curing-conditions | Coating thickness | Solvent-resistance[1] | Pencil-hardness[2] | Yellow-ing |
|---|---|---|---|---|---|
| 800 mPas at 25° C. | 5 minutes at 140° C. | ~80 μm | >75 | 4 H | Nothing |

[1]Solvent resistance of the hardened coating, tested by repeated rubbing of the film surface with a woodpulp cloth impregnated with methyl ethyl ketone (MEK). The number of rubbings that still did not produce any visible damage to the coating was measured.
[2]Lead pencil hardness after the hardening, at which the film exhibits the first visible signs of damage Example 2

Example 1 was repeated, but with 250 mg of tri-n-dodecylphosphine. Pot-life: 6 minutes.

| Viscosity of the curable mixture | Curing-conditions | Coating thickness | Solvent-resistance | Pencil-hardness | Yellow-ing |
|---|---|---|---|---|---|
| 820 mPas at 25° C. | 5 minutes at 140° C. | ~80 μm | >75 | 4 H | Nothing |

Example 3

Example 1 was repeated, but with 250 mg of tricyclohexylphosphine. Pot-life: 3 minutes.

| Viscosity of the curable mixture | Curing-conditions | Coating thickness | Solvent-resistance | Pencil-hardness | Yellow-ing |
|---|---|---|---|---|---|
| 800 mPas at 25° C. | 5 minutes at 140° C. | ~80 μm | >75 | 4 H | Nothing |

Example 4

6.00 g of a diacetoacetate (viscosity: 200 mPas at 25° C.), prepared by transesterification of 2-butyl-2-ethyl-1,3-propanediol and ethyl acetoacetate,

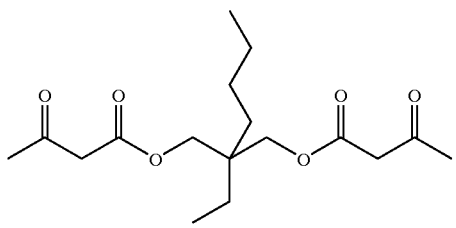

was mixed with 100 mg of tri-n-octylphosphine. Then, 6.00 g of trimethylpropane triacrylate was added under vigorous stirring. The mixture was stirred for 1 minute and applied on top of an aluminum test panel. Pot-life: 2–3 minutes.

| Viscosity of the curable mixture | Curing-conditions | Coating thickness | Solvent-resistance | Pencil-hardness | Yellow-ing |
|---|---|---|---|---|---|
| 180 mPas at 25° C. | 15 minute at 120° C. | ~25 μm | >75 | 4 H | Nothing |
| 180 mPas at 25° C. | 7 days at 25° C. | ~25 μm | >75 | 3 H | Nothing |

Example 5

6.00 g of a diacetoacetate (viscosity: 200 mPas at 25° C., same structure as in example 4), was mixed with 200 mg of tri-n-octylphosphine. Then, 6.00 g of trimethylopropane triacrylate was added under vigorous stirring. The mixture was stirred for 1 minute and applied on top of an aluminum test panel. Pot-life: 2–3 minutes.

| Viscosity of the curable mixture | Curing-conditions | Coating thickness | Solvent-resistance | Pencil-hardness | Yellow-ing |
|---|---|---|---|---|---|
| 180 mPas at 25° C. | 7 days at 25° C. | ~25 μm | >75 | 5 H | Nothing |

Example 6

6.00 g of a diacetoacetate (viscosity: 200 mPas at 25° C., same structure as in example 4), was mixed with 120 mg of tri-n-octylphosphine. Then, 9.00 g of the epoxyacrylate Ebecryl 3700 (Trademark of UCB) was added under vigorous stirring. The mixture was stirred for 10 minutes and applied on top of an aluminum test panel. Pot-life: 3–4 hours.

| Viscosity of the curable mixture | Curing-conditions | Coating thickness | Solvent resistance | Pencil-hardness | Yellow-ing |
|---|---|---|---|---|---|
| 1600 mPas at 25° C. | 7 days at 25° C. | ~80 μm | >75 | 3 H | Nothing |
| 1600 mPas at 25° C. | 35 minutes at 70° C. | ~80 μm | >75 | 5 H | Nothing |
| 1600 mPas at 25° C. | 10 minutes att 25° C. | ~80 μm | >75 | 5–6 H | Nothing |

Example 7

An acrylic copolymer, containing 25% methyl methacrylate, 25% butyl acrylate, 25% styrene and 25% 2-acetoacetoxyethyl methacrylate was prepared at 95° C. with azobisisobutyronitril as initiator and 2-mercaptoethanol as chain transfer agent. The copolymerisation was carried out in 62.5% of the diacetoacetate from example 4, which later serves as a reactive diluent.

5.00 g of this copolymer solution was dissolved in 5.00 g of trimethylolpropane triacrylate and treated with 150 mg of tri-n-octylphosphine. The mixture was stirred for 10 minutes and applied on top of a steel test panel. Pot-life: 30 minutes.

| Viscosity of the curable mixture | Curing-conditions | Coating thickness | Solvent-resistance | Pencil-hardness | Yellowing |
|---|---|---|---|---|---|
| 1400 mPas at 25° C. | 7 days at 25° C. | ~50 μm | >75 | 4 H | Nothing |
| 1400 mPas at 25° C. | 35 minutes at 70° C. | ~500 μm | >75 | 4 H | Nothing |

Example 8

6.00 g of pentaerithrittetraacrylate was mixed with 150 mg of tri-n-octylphosphine. Then, 5.00 g of β-cyanoacetic acid ethylester was added under vigorous stirring. The reaction mixture started to heat up and formed after 30 seconds a clear solid body, which was insoluble in organic solvents.

Example 9

10.00 g of pentaerithrittetraacrylate was mixed with 250 mg of tri-n-octylphosphine. Then, 7.00 g of acetyl acetone was added under vigorous stirring. The mixture was applied on top of a steel test panel and cured. Pot-life: 30 minutes.

| Viscosity of the curable mixture | Curing-conditions | Coating thickness | Solvent-resistance | Pencil-hardness | Yellowing |
|---|---|---|---|---|---|
| 200 mPas at 25° C. | 15 minutes at 120° C. | ~25 μm | >75 | 3 H | Nothing |

Example 10

250 mg of tri-n-octylphosphine was dissolved in 8.00 g of dimethyl malonate. Then, a mixture of 8.0 g of the polyesteracrylate Ebecryl 830 (Trademark of UCB) and 4.0 g of tripropylene glycol diacrylate was added. The mixture was applied on top of an aluminum test panel and cured at elevated temperature.

| Curing-conditions | Coating thickness | Solvent-resistance | Pencil-hardness | Yellowing |
|---|---|---|---|---|
| 15 minutes at 120° C. | ~80 μm | >75 | 5 H | Nothing |

What is claimed is:

1. A curable mixture comprising at least one compound containing at least two α,β-unsaturated carbonyl groups and at least one compound containing at least one CH-acidic methylene group and at least one trialkylphosphine.

2. A curable mixture according to claim 1, wherein the compound containing at least two α,β-unsaturated carbonyl groups is an acrylate, methacrylate, fumarate, maleate or itaconate.

3. A curable mixture according to claim 1, wherein the compound containing at least one CH-acidic methylene groups is an acetoacetate, malonate, β-diketone or β-cyanoacetate.

4. A curable mixture according to claim 1, wherein the trialkylphosphine contains a linear, branched or cyclic alkyl chain having 5–20 carbon atoms.

5. A curable mixture according to claim 4, wherein the trialkylphosphine is tri-n-hexylphosphine, tricyclopentylphosphine, tricyclohexylphosphine, tri-n-octylphosphine, tri-n-decylphosphine, tri-n-dodecylphosphine or tris(2,4,4-trimethylpentyl)phosphine.

* * * * *